July 9, 1957 NILS-OLOF OLESTEN 2,798,743
FLEXIBLE COUPLING DEVICE FOR CONNECTING JET-ENGINE-POWERED
AIRCRAFT TO GROUND MOUNTED SILENCERS
Filed March 23, 1955 3 Sheets-Sheet 1
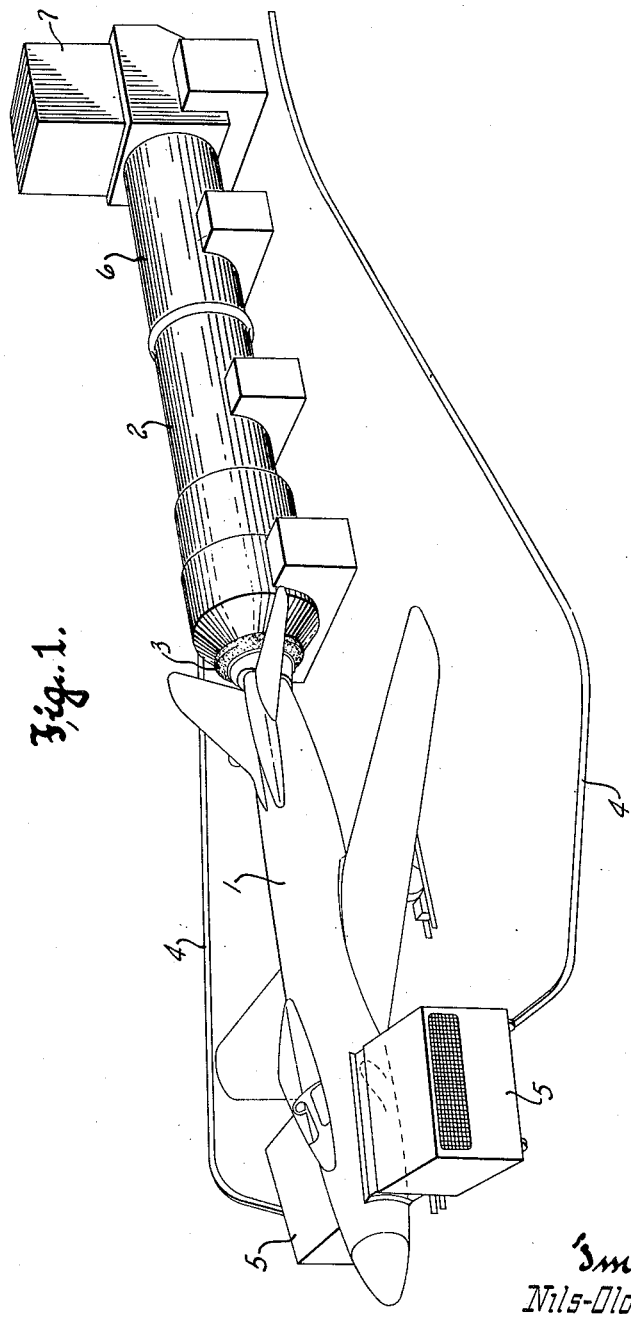

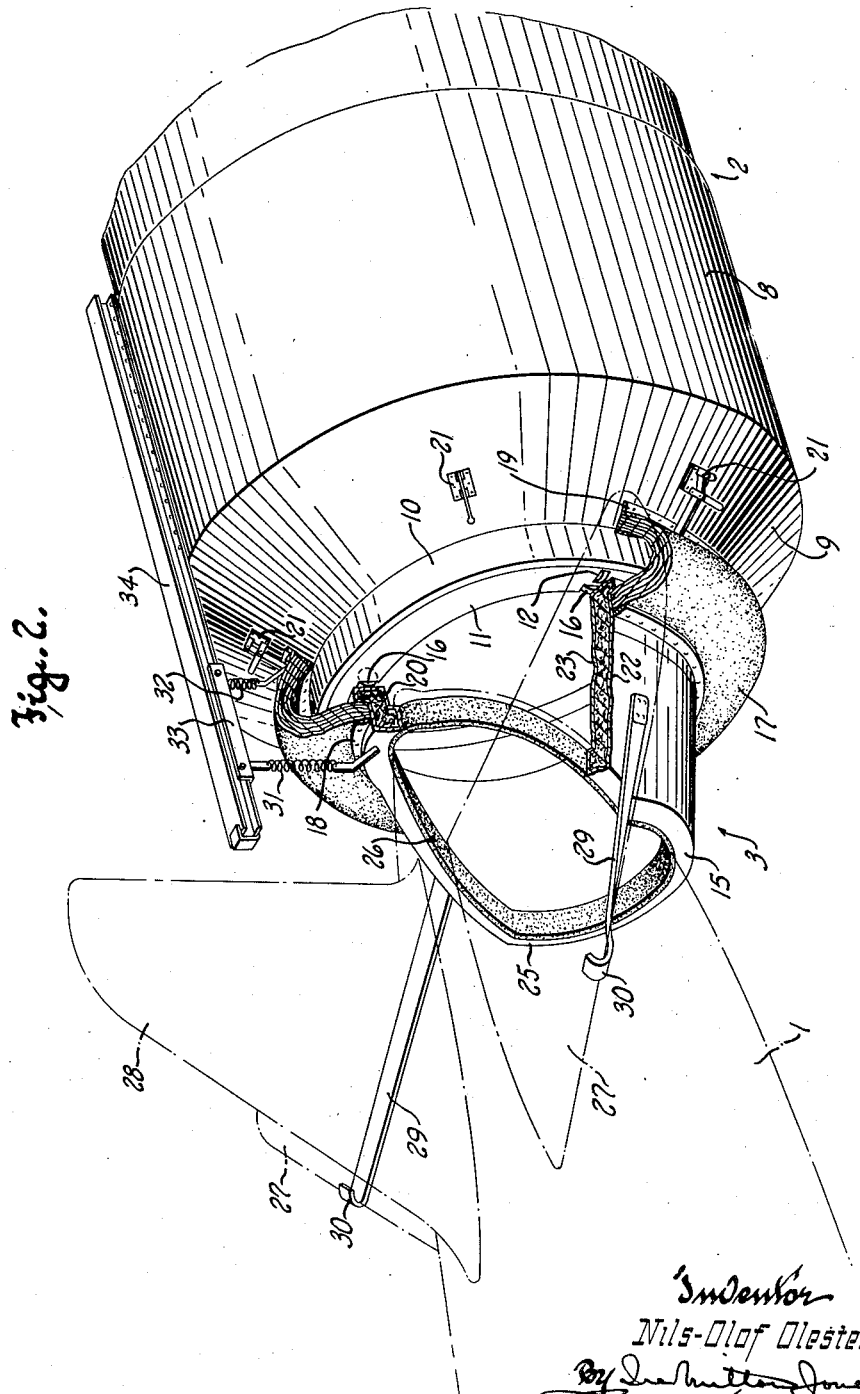

July 9, 1957 NILS-OLOF OLESTEN 2,798,743
FLEXIBLE COUPLING DEVICE FOR CONNECTING JET-ENGINE-POWERED
AIRCRAFT TO GROUND MOUNTED SILENCERS
Filed March 23, 1955 3 Sheets-Sheet 3
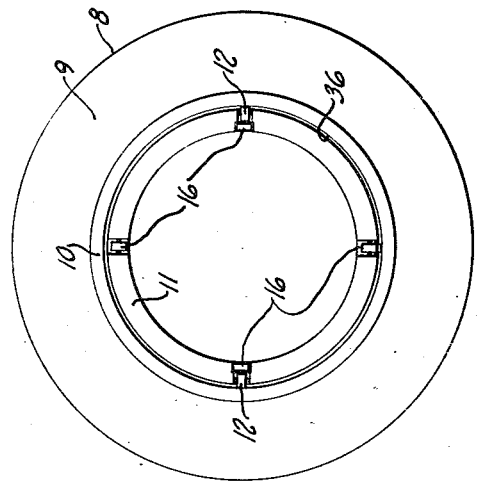
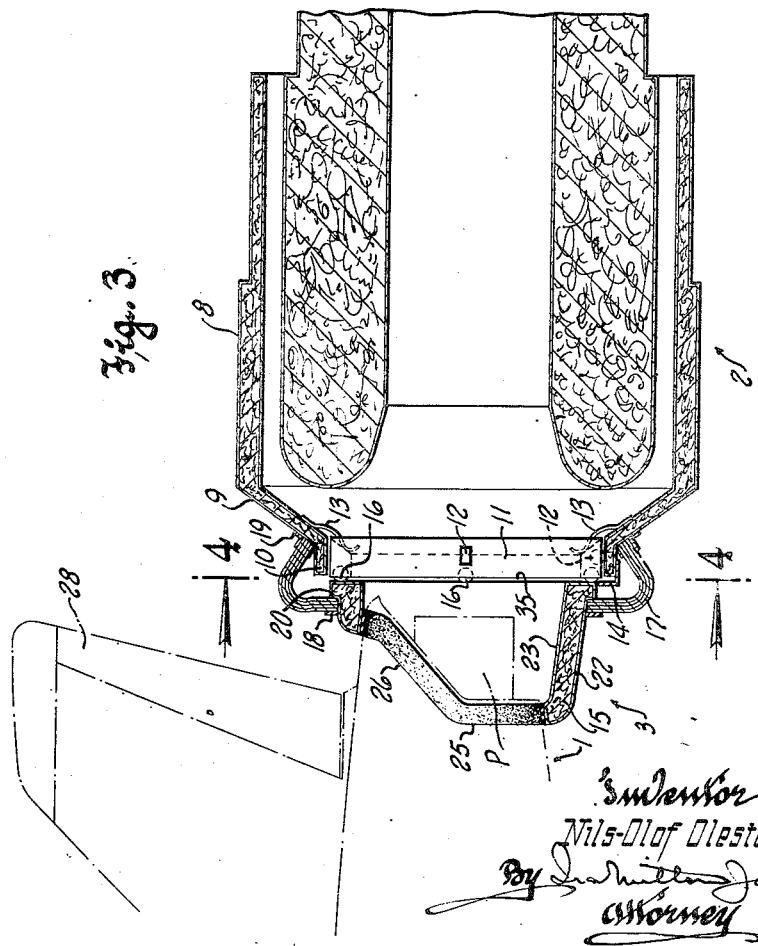

United States Patent Office 2,798,743
Patented July 9, 1957

2,798,743

FLEXIBLE COUPLING DEVICE FOR CONNECTING JET-ENGINE-POWERED AIRCRAFT TO GROUND MOUNTED SILENCERS

Nils-Olof Olesten, Linkoping, Sweden, assignor to Svenska Aeroplan Aktiebolaget, Linkoping, Sweden, a corporation of Sweden Application March 23, 1955, Serial No. 496,292

7 Claims. (Cl. 285—47)

The present invention relates to the silencing of jet engines, and refers more particularly to a device for connecting jet engine powered airborne vehicles, such as aircraft, guided missiles, etc., while on the ground, to a silencer. Jet engines with or without afterburners, emit sounds of such intensity, especially during operation thereof on the ground, that muffling or some suitable silencing is absolutely necessary. To meet this demand, a so-called ground silencer was developed. This silencer consists essentially of a chamber adapted to receive the discharging gas from the jet engine and cool it either by mixing it with cold air alone or by mixing it with cold air and, at the same time, cooling it by water injection. The cooled gases are conducted through the silencer to an outlet at its rear end, where they are deflected upwards and thereafter escape to the open air.

While the silencer is known to be capable of performing the function for which it was intended, the lack of some satisfactory way of connecting it to the airplane, or other airborne vehicle, has robbed it of much of its value. Hence, even with the silencer, considerable noise was experienced because of the escape of gases through the space between the tail pipe of the engine and the inlet of the silencer. Many schemes have been tried in the past to correct this condition, but heretofore no satisfactory solution to the problem has been offered. The need for accommodating the inevitable relative movement between the engine and the silencer resulting from the movement of the vehicle caused by the varying thrust of the motor and the variations in length of the vehicle and the silencer due to the extreme temperature changes, greatly complicates the problem.

The primary object of this invention is, therefore, to provide an improved connection between a ground mounted jet engine silencer and the exhaust pipe of a jet engine powered airborne vehicle, by which the disadvantages of prior connecting devices are eliminated.

To achieve this purpose, the invention has as another of its objects to provide a connecting device which comprises essentially a tubular connector adapted to be applied in sealing relation to the inlet of the silencer and the part of the aircraft surrounding the tail pipe of its motor, or motors, which tubular connector is both axially and laterally movable with respect to the silencer to allow relative movement between the vehicle and the silencer, so that, despite such relative movement, the connection between the vehicle and the silencer will be substantially gas tight.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a perspective view of an airplane connected to a ground mounted silencer by means of the device of this invention;

Figure 2 is a perspective view, partially in section and at an enlarged scale, showing the connector device connecting the airplane to the silencer;

Figure 3 is a vertical longitudinal sectional view of the connector device, and

Figure 4 is a cross sectional view through Figure 3 along the plane of the line 4—4.

Referring to the drawing, the numeral 1 designates an airplane provided with one or more jet engines, not shown but, as is customary, having the tail pipe P thereof opening to the atmosphere at the tail end of the fuselage. The numeral 2 designates a ground mounted silencer for muffling the sound of the jet engine, or engines; and the numeral 3 designates the connector device of this invention, which connects the silencer to the airplane in a manner assuring that the exhaust from the engine enters the silencer.

A pair of air intake silencers 5 are positioned at opposite sides of the forward part of the airplane and connected to its air intake to muffle the sound arising from the compressor and the flow of air into the air intake. These silencers are preferably mounted on rails 4 to facilitate their placement in operative relation to the aircraft.

The silencer 3 comprises a sound muffling part 6, and a gas exhaust part 7, but since the invention is not in the silencer per se and as such silencers are already known, only those parts of the silencer directly adjacent to the connecting device 3 have been shown in detail. Thus, the forward part of the silencer 2 is in the form of a cylindrical wall 8 constricted at its front into a funnel-shaped part 9 which, in turn, terminates in a cylindrical flange or collar 10. This flange or collar defines the inlet of the silencer.

Inside the flange or collar 10 is an axially movable guide ring 11 having rollers 12 mounted therein and projecting beyond its outer periphery to rollingly engage the inside of the flange 10. A pair of leaf springs 13 fixed to the inside of the funnel-shaped part 9 press on the inner end surface of the ring 11 and thereby urge the ring toward a position defined by a stop 14 and in which the ring projects slightly from the flange or collar 10. Attention is directed to the fact that the front end of the ring is flat and lies in a plane perpendicular to the axis of the ring.

Perhaps the main element of the connector is a tubular connector member 15 in the form of a truncated cone, the large end of which has somewhat smaller internal diameter than the ring 11. The rear end of the connector part 15 is flat and bears against a number of rollers 16 mounted in the forward edge of the ring 11, so as to be freely movable laterally across the front of the ring 11, an extent permitted by an annular flexible bellows 17 by which the connector member 15 is sealingly connected with the silencer.

The bellows 17 consists of a plurality of alternately arranged layers of plastic and felt, and its opposite ends are provided with metal fastening rings 18 and 19. The ring 18 is riveted to a radial flange 20 formed on the large end of the connector member, and the ring 19 is connected, in substantially sound tight relation, to the funnel-shaped part 9 of the silencer by means of quickly releasable fasteners 21.

The connector member 15 is of a sound absorbing construction and comprises outer and inner sheet metal shells 22 and 23, respectively, with a sound absorbing mass packed therebetween.

The smaller front end of the member 15 is arranged to encompass and receive the tail end portion of the fuselage, and for this purpose, the front of the member 15 is partially defined by a semi-circular edge 25 which fits around the lower half of the fuselage and partly by an inclined edge 26 which extends from the edge 25 obliquely rearwardly and upwardly to lie below the horizontal stabilizing surface 27 of the airplane and enclose the upper part of the fuselage behind the veritcal stabilizing surface 28 of the airplane. A pair of straps 29 fixed at one end to diametrically opposite sides of the member 15, provide means for drawing the connector member 15 tightly against the conical rear end of the fuselage from which the tail pipe P of the jet engine or engines projects. To attach the straps to the aircraft their outer ends have hooks 30 engageable over the forward edges of the horizontal stabilizers 27.

In order to reduce the strain on the airplane when the connector member 15 is applied to its fuselage, the connector member is resiliently suspended by springs 31 and 32 depending from a carriage 33 slidable along a cantilever beam 34 fixed on the cylindrical wall 8 of the silencer and projecting forwardly therefrom.

In applying the connector device to an airplane, the airplane is backed into the connector member 15 and then moved back until the member 15 engages the ring 11 in the outer position thereof, as shown in Figure 3. With the parts thus arranged the straps 29 are fastened in place so that the connector member is tightly held to the tail end portion of the airplane. The mobility of the guide ring 11 relative to the silencer and the mobility of the member 15 in relation to the ring accommodates the inevitable relative movement between the airplane and the silencer and assures that the clearances, indicated by the numerals 35 and 36 will be held constant. Accordingly, the sound of any gas escaping through these clearances and passing into the space within the bellows is readily muffled by the bellows.

From the foreoing description taken together with the accompanying drawings, it will be readily understood that this invention provides a practical and highly effective manner of coupling the tail pipe of a jet-engine-powered aircraft to a ground mounted silencer, and that the invention achieves its purpose of providing a substantially gas-tight connection between the aircraft and the silencer despite the inevitable relative movement which takes place between the aircraft and the silencer.

It will also be understood that while in the foregoing disclosure the jet engine is defined as being in the fuselage, in larger airplanes jet engines are usually placed in the wings. Therefore, where the location of the tail pipe of the engine is said to be in the tail end of the airplane, placement thereof in the wings is not to be excluded.

What I claim as my invention is:

1. A device for connecting a jet-engine-powered airborne vehicle, such as an aircraft, a guided missile or the like, while the same is on the ground, to a silencer having an open inlet at its front end to receive the gases issuing from the engine, comprising: a tubular connector member having open front and rear ends, the open front end of the connector member being shaped to fit onto the tail of a jet engine powered airborne vehicle with the discharge pipe of the vehicle opening into the connector member; an annular part axially movably mounted in the inlet at the front end of the silencer; the front end of said annular part and the rear end of said tubular connector member having opposing flat faces so that said connector member and said annular part can cooperate with one another in defining a substantially continuous duct, despite lateral displacement of the connector member from a normal position of coaxiality with said annular part; means yieldingly urging said annular part forwardly with respect to the silencer to thereby urge said annular part toward said connector member and thus maintain said flat faces contiguous to one another; means mounting the connector member with its rear end adjacent to the front end of said annular part for translatory movement laterally relative to the annular part and axially therewith, said means comprising a flexible bellows encircling said connector member and having its front end attached thereto with a gastight connection, the rear end portion of the bellows encompassing the front end portion of the silencer; and means on the fixed portion of the silencer for yieldingly supporting a substantial portion of the weight of the connector member and holding it coaxial with the annular part.

2. The device of claim 1 further characterized by the provision of anti-friction means axially slidably mounting the annular part in the silencer to facilitate axial adjustment of the connector member in response to axial displacement of the vehicle relative to the silencer; and other anti-friction means interposed between the annular part and the connector member to facilitate lateral displacement of the connector member in response to lateral movement of the vehicle relative to the silencer.

3. A device for connecting an airborne vehicle provided with jet engine propulsion means to a ground mounted silencer having an open inlet at its front end to receive the gases issuing from the jet engine propulsion means, comprising: a tubular connector of substantially soundproof material having an open front end shaped to fit parts of a vehicle, encompassing rear portions of its jet engine propulsion means; bellows means providing a gastight connection between said tubular connector and the silencer and providing for axial and lateral translatory movement of the tubular connector relative to the silencer; and means for yieldingly resisting axial displacement of said tubular connector and for conducting gases from the jet engine propulsion means substantially directly into the silencer, said last named means comprising an annular part in the open inlet of the silencer mounted for axial movement relative to the silencer, said part having a substantially flat front face opposing the rear face of the tubular connector so that said annular part and tubular connector cooperate to provide a substantially continuous duct, despite limited relative lateral shifting of the tubular connector out of coaxiality with the annular part, and means yieldingly biasing said annular part forwardly to urge the flat front face of the annular part toward engagement with the rear face of the tubular connector.

4. The device of claim 3, further characterized by means on the silencer for yieldingly supporting a substantial portion of the weight of the tubular connector and maintaining the same substantially coaxial with the silencer inlet, said means comprising a rigid arm extending forwardly from the silencer and spring means connected between said arm and the tubular connector.

5. A device for connecting a jet-engine-powered airborne vehicle, such as an aircraft, a guided missile or the like, while the same is on the ground, to a silencer having an open inlet at its front end, comprising: a tubular connector member having an open front end and an open rear end and having its wall formed essentially of sound absorbing material, the open front end of said connector member being shaped to snugly receive therein the tail end portion of an airborne vehicle with its discharge pipe opening into the connector member, the open rear end of the connector member lying in a common plane substantially perpendicular to the axis of the connector member; a ring at the inlet end of the silencer, said ring having a front end lying substantially in a common plane and being of a size to fit against the rear end of the connector member; means mounting said ring in the inlet of the silencer in a manner enabling limited axial movement of the ring with respect to the silencer; means mounting said tubular connector member in front of said ring with the rear end of the connector member and the front end of the ring close together and opposing one another, and providing for limited lateral translation of the connector member out of a normal position of coaxiality with the ring and for limited axial translation of the connector member with the ring, said means comprising a flexible annular bellows encircling the adjacent portions of the connector member and silencer and having substantially gastight connections with both; and means yieldingly urging said ring forwardly with respect to the silencer so that upon the imposition of rearward end thrust on the ring by the tubular connector member, said connector member and ring are yieldingly held together in a manner allowing relative lateral movement therebetween and providing for substantially straight through flow of gases from the outlet of the jet engine to the silencer.

6. The device of claim 5, further characterized by the fact that the connection between the bellows and the silencer is readily releasable.

7. The device of claim 5, further characterized by means on the connector member engageable with a flying surface on a vehicle connected with the silencer for drawing the connector member tightly against the tail end portion of the vehicle.

References Cited in the file of this patent

UNITED STATES PATENTS

| 91,824 | Chapman | June 29, 1869 |
| 2,685,936 | Brenneman et al. | Aug. 10, 1954 |

FOREIGN PATENTS

| 676,419 | France | Nov. 28, 1929 |